Aug. 20, 1968 R. W. WOODRING 3,397,525
BREAKAWAY KNIFE HOLDER
Filed July 1, 1965
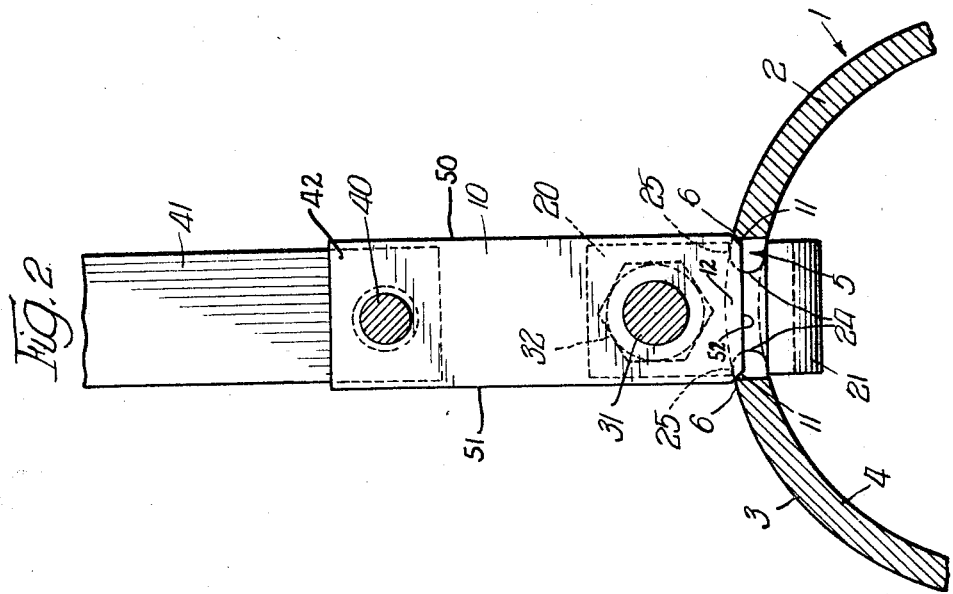
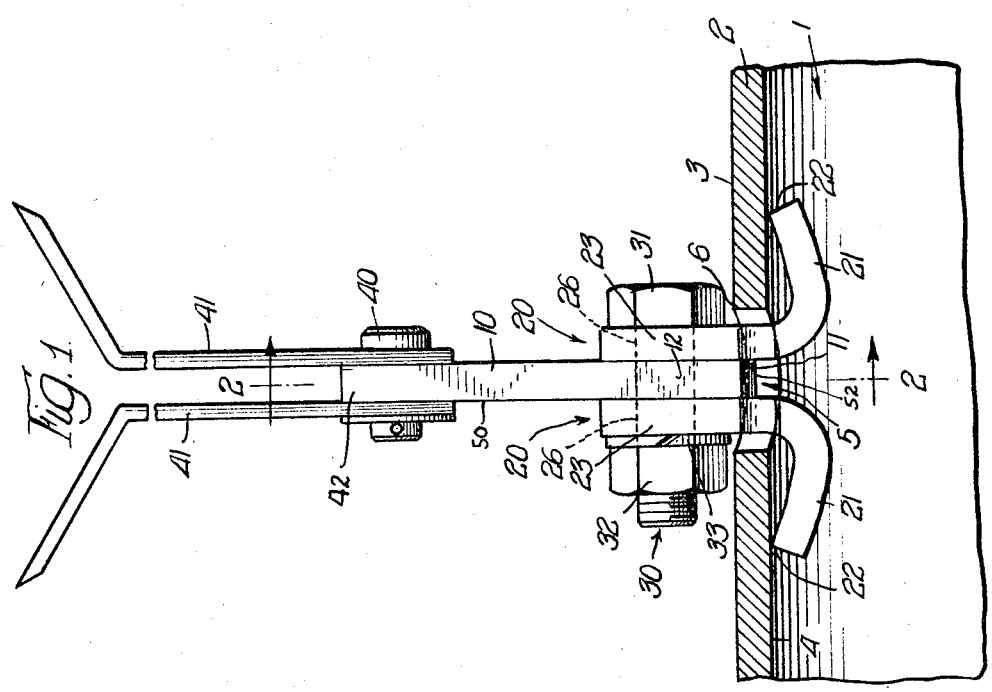
Inventor:
Robert W. Woodring,
John J. Kowalik
Atty

United States Patent Office 3,397,525
Patented Aug. 20, 1968

3,397,525
BREAKAWAY KNIFE HOLDER
Robert W. Woodring, La Grange, Ill., assignor to International Harvester Company, Chicago, Ill., a corporation of Delaware
Filed July 1, 1965, Ser. No. 468,737
13 Claims. (Cl. 56—294)

This invention generally relates to a mounting for rotary chopper knives and more particularly relates to an improved knife holder suitable for use with a flail mower structure as disclosed in pending application Ser. No. 399,586, filed Sept. 28, 1964, now Patent No. 3,292,353.

The principal object of this invention is to provide a novel mounting for the knives of a rotary chopper which securely retains the knives in a cutting position during the normal mowing operation and which prevents damage to the knives and chopper if the knives encounter an immovable obstacle.

A more specific object of this invention is to provide an improved flail knife holder for rotary choppers which permits the knife to yield or break away from a normal cutting position when an immovable obstacle is struck.

An additional object of this invention is to provide an improved flail knife holder for a rotary chopper which allows the knife to be readily returned to its normal cutting position with respect to the supporting shaft structure if displaced therefrom during the mowing operation.

Still another object of this invention is to provide a novel mounting for the knives of a rotary chopper which releasably retains the knives in a normal cutting position by the combined action of frictional and camming forces.

The above-identified pending application discloses and claims an improved structure for mounting a cutting knife to a hollow rotor shaft which eliminates the need for welding or otherwise permanently attaching the knife holding means to the shaft. The knife mounting structure disclosed in said application generally comprises a pair of knife holding elements which are extended through an opening in the wall of the shaft and which are securely but removably clamped to the wall of the shaft adjacent to the periphery of the opening. A suitable cutting knife is rigidly secured to the outer portion of these holding elements so that the knife extends outwardly from the rotor shaft.

It has been found that the service life of such structures in which the cutting knives are rigidly secured to the holding means on the shaft will be materially enhanced if the knife holder is provided with means for allowing the knife to yield or break away from a fixed position with respect to the rotor shaft, and prevent damage to the knife and the shaft, when an immovable object, such as a rock or a tree stump, is encountered. Hence, this invention contemplates providing knife holding structures such as disclosed in the above-identified application with a movably mounted breakaway member which allows the knife to rotate from a rigid or fixed position when obstacles are encountered during the cutting operation.

This invention may therefore be generally described as a knife holder including a breakaway member provided with a cam surface, and further including clamping means to frictionally retain said member in a position transverse to a rotor shaft with the cam surface of said member in releasable engagement with an abutment provided on the exterior of the shaft. A cutting knife secured to such member would thus be releasably held in a cutting position with respect to the shaft by the resulting frictional and camming forces, but would be allowed to rotate toward the shaft when an obstacle is struck with sufficient force to overcome these combined frictional and camming forces.

More specific objects and features of this invention will be apparent from a description of a preferred embodiment thereof, as illustrated in the accompanying drawings. In these drawings:

FIGURE 1 is a side elevational view in partial section of the knife holder in accordance with this invention, and
FIGURE 2 is a sectional view taken along the line 2—2 in FIGURE 1.

Referring to these drawings, the illustrated rotor shaft 1 of the chopper is generally cylindrical in cross-section, and includes the shaft wall section 2 having outer surface 3 and inner surface 4. This wall section 2 is provided with an opening 5 extending therethrough, as best seen in FIGURE 1. The opening 5 thereby defines an exterior abutment surface 6 on the shaft 1 which co-operates with the knife holder in a manner described in more detail hereinafter.

The improved knife holder in accordance with this invention includes an elongate breakaway member 10 having a cam surface 11 on its lower portion. The cam surface 11 is engageable with the abutment surface 6 on the wall section 2 when member 10 is positioned generally transverse to the shaft 1, as best illustrated in FIGURE 2, and will disengage from the abutment surface 6 when the member 10 is pivoted out of such transverse position. As further illustrated in FIGURE 2, this arrangement can be readily provided by making the width of member 10 larger than the diameter of the opening 5 in the wall section 2 so that inner end 12 of the member 10 defines the cam surfaces for the member. As best seen in FIGURE 1, the breakaway member 10 is also provided with suitable means, such as pin connection 40, to secure cutting knives 41 to the outer portion of the breakaway member.

The knife holder of this invention also includes holding means to pivotally connect the breakaway member 10 to the shaft 1 so that the cam surface 11 of the member is positioned above the opening 5 adjacent to the abutment surface 6. This holding means may be insertable through the opening 5, and preferably comprises the knife holding structure disclosed in the above-identified pending application.

As shown in FIGURE 1, this knife holding structure disclosed in the above-identified application includes a pair of oppositely disposed J-shaped elements 20 each having a lower hooked portion 21 engageable with the inner surface 4 of wall section 2 at the edge 22, and an upper shank portion 23 which is smaller in width than the diameter of opening 5 so that the shanks may be inserted upwardly through the opening. FIGURE 2 illustrates that the shanks 23 are provided with side notches 24 made slightly larger than the wall section 2 of the shaft which permits the notches to receive the wall section at the periphery of the opening 5 when the holding elements are positioned on the shaft 1. As more fully described in the above-mentioned pending application, this arrangement of the notches 24 defines a ledge 25 on the shanks which engages with the outer surface 3 of the wall section and acts as a fulcrum to drive the edges 22 on the lower hooked portion of the element upwardly into secure engagement with the inner surface 4 of the shaft when the shank portions 23 are drawn together. FIGURE 1 further illustrates that the shanks 23 are additionally provided with aligned apertures 26 for the insertion of a pivot pin or bolt assembly 30 which pivotally connects the breakaway member 10 to the holding elements 20.

When mounting this embodiment of the knife holder onto the shaft 1 of the cutter, the J-shaped holding elements 20 are first inserted through the opening 5 in the shaft so that the ledges 25 on the shanks 23 engage the outer surface 3 of the wall section 2, and the edges 22 on the lower hooked portions 21 engage the inner surface 4. The lower portion of the breakaway member 10 is then placed between the separated shanks 23 in a transverse position with respect to the shaft 1, with the cam surface 11 of the member directly above the abutment surface 6 defined by the periphery of the opening 5. The bolt assembly 30, including bolt 31, nut 32 and lock washer 33, can then be extended through the aligned apertures 26 on the shanks 23 and connected to the member 10 to pivotally connect the member to the shaft 1.

In accordance with this invention, the tightening of bolt assembly 30 draws the shanks 23 together into frictional engagement with the lower portion of the member 10 and thus provides clamping means which frictionally retains member 10 in a normal transverse position with respect to the shaft 1. It is preferred that this bolt assembly 30 be tightened with a torque wrench or the like so the bolt exerts a sufficient clamping force on the member 10 to retain the member transverse to the shaft 1 during the normal mowing operation.

As fully described in the above-identified application, the tightening of the bolt assembly 30 will also rotate the holding elements 20 about the fulcrums provided by the ledges 25 and cause the lower edges 22 to bite into the inner surface 4 of the wall section 1. The resulting engagement of the ledges 25 with the outer surface 3 of the wall section, and of the edges 22 with the inner surface 4, as illustrated in FIGURE 1, securely clamps the knife holder of this invention to the shaft 1.

In addition, as the tightening of the bolt assembly 30 draws the lower hooked portions 21 of the elements 20 upwardly against the inner surface 4, the spring action of these lower hooked portions 21 creates a concurrent downwardly-directed force which tends to force the elements 20 and the bolt assembly 30 toward the opening 5 in the shaft. Since the member 10 is pivotally connected to the bolt assembly 30, this arrangement thus urges the cam surface 11 of the member into releasable engagement with the abutment surface 6 at the outer periphery of the opening 5.

It is apparent from the above description of an embodiment of this invention that the friction force exerted on the member 10 by the shanks 23, and the camming force resulting from the engagement of cam surface 11 with the abutment surface 6, co-operate to releasably maintain the breakaway member 10 and its associated knives 41, which are pivoted by pin 40 to the outer end 42 of the breakaway member, in a normal mowing position transverse to the rotor shaft 1. It is further apparent that if the member 10 or knives 41 engage an immovable obstacle during the mowing operation, such as a rock or a tree stump, the frictional clamping force on the member, and the spring force urging the cam surface 11 downwardly, will be overcome. The member 10 can thus break away from this normal transverse position and rotate toward the rotor shaft 1, with cam surface 11 moving out of engagement with the abutment surface 6 and into the opening 5 in the shaft. The generally rectangular breakaway member 10 has lateral edges 50, 51 and an inner edge 52.

The breakaway knife holder according to this invention therefore prevents damage to the knives and rotor shaft of the cutter which would otherwise occur when the knives strike a solid obstacle during the cutting operation by allowing the knives to retract from the obstacle, and further permits the knives to be readily returned to a normal cutting position on the rotor shaft if displaced therefrom.

It should be understood that the foregoing is merely illustrative of the invention. Various modifications in the structural and functional features of this breakaway knife holder can be devised by those skilled in the art without departing from the scope of this invention, as set forth in the accompanying claims.

What is claimed is:

1. A knife holder for a cutter having a rotor shaft including an exterior abutment surface, said holder comprising
   an elongate member including a cam surface on its lower portion,
   means to pivotally connect said member to said shaft with said cam surface adjacent to said abutment surface on said shaft,
   clamping means to frictionally retain said member in a transverse position with respect to said shaft,
   means to urge said cam surface into releasable engagement with said abutment surface with said member in said transverse position, and
   means to secure a cutting knife to said member.

2. A knife holder for a cutter having a rotor shaft which includes a wall section provided with an opening therethrough, said holder comprising
   an elongate member including a cam surface on its inner portion,
   means to pivotally connect said member to said shaft with said cam surface above said opening,
   clamping means to frictionally retain said member in a transverse position with respect to said shaft above said opening,
   means to urge said cam surface into releasable engagement with the outer surface of said wall section of said shaft at the outer periphery of said opening with said member in said transverse position, and
   means to secure a cutting knife to the outer portion of said member.

3. A knife holder according to claim 2 wherein said means to pivotally connect said member to said shaft comprises holding means insertable through said opening, said holding means including means at its upper portion engageable with the outer surface of said wall section and means at its lower portion engageable with the inner surface of said wall section to retain said holding means within said opening, and means to pivot said member to the upper portion of said holding means.

4. A knife holder according to claim 3 wherein said holding means comprises a pair of oppositely disposed J-shaped holder elements each having a lower hooked portion engageable with the inner surface of said wall section and an upper shank portion insertable through said opening, said shank portions including ledges engageable with said outer surface of said wall section and further including means to receive a pivot pin to mount said member between said shank portions.

5. A knife holder according to claim 4 wherein said clamping means comprises means to draw said shank portions together into frictional engagement with said member mounted therebetween.

6. A knife holder according to claim 5 wherein said means to urge said cam surface into releasable engagement with the outer surface of said wall section comprises the spring action of said lower hooked portions of said J-shaped elements engageable with the inner surface of said wall section to urge said elements inwardly with respect to said shaft as said shaft portions are drawn together.

7. A knife holder for a cutter having a rotor shaft which includes a wall section provided with an opening therethrough, said holder comprising
   an elongate member including a cam surface on its lower portion,
   a pair of oppositely opposed J-shaped holder elements each having a lower hooked portion engageable with the inner surface of said wall section and an upper shank portion insertable through said opening, said shank portions including ledges engageable with the outer surface of said wall section and further including aligned apertures,
   a bolt assembly extending through said aligned apertures and connected to said member between said shanks to pivotally connect said member to said shaft with said cam surface above said opening, said bolt assembly adapted to draw said shanks together into engagement with said member to frictionally retain said member in a transverse position with respect to said shaft above said opening, said bolt assembly further adapted to draw said hook portions of said holder elements upwardly against said inner surface of said wall section to urge said cam surface into releasable engagement with said outer surface of said wall section of said shaft at the outer periphery of said opening with said member in said transverse position, and means to secure a cutting knife to the outer portion of said member.

8. A knife holder for a cutter according to claim 7 wherein the width of said member is larger than the diameter of said opening in said wall section of said shaft and wherein said cam surface comprises the inner end of said member.

9. A knife holder for a cutter according to claim 7 wherein said ledges in said shank portions of said holder elements comprise side notches to receive said wall section of said shaft.

10. In a cutter comprising a rotor shaft member having a radially extending knife-mounting member and knife-holding cam means connected to said mounting means for relative movement with respect thereto and having camming engagement with one of said members.

11. The invention according to claim 10 and the connection between said knife-mounting member and said knife-holding cam means comprising a pivot on an axis generally parallel to the axis of the shaft member.

12. The invention according to claim 11 and said knife-holding cam means having a camming surface opposing the shaft member, and said shaft member having a surface co-operating with the camming surface and disposed radially inwardly of the periphery of the shaft member.

13. The invention according to claim 10 and said connection between the knife-mounting member and the knife-holding cam means comprising a pivot extending generally axially of the shaft member and said cam means having cam surfaces spaced circumferentially of the shaft member, opposing surfaces on the shaft member, engageable with said cam surfaces, said cam surfaces converging toward said shaft member.

References Cited
UNITED STATES PATENTS

| | | | |
|---|---|---|---|
| 2,026,790 | 1/1936 | Mankoff | 241—194 |
| 2,938,326 | 5/1960 | Lundell | 56—29 XR |
| 3,292,353 | 12/1966 | Woodring et al. | 56—294 |

ANTONIO F. GUIDA, *Primary Examiner.*